(12) United States Patent
Hsu et al.

(10) Patent No.: US 9,538,540 B2
(45) Date of Patent: Jan. 3, 2017

(54) SMART CONGESTION CONTROL FOR RRC CONNECTED MODE IN LTE SYSTEMS

(71) Applicant: MEDIATEK INC., Hsinchu (TW)

(72) Inventors: Chia-Chun Hsu, New Taipei (TW); Chie-Ming Chou, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/639,437

(22) Filed: Mar. 5, 2015

(65) Prior Publication Data

US 2015/0257161 A1   Sep. 10, 2015

Related U.S. Application Data

(60) Provisional application No. 61/948,814, filed on Mar. 6, 2014.

(51) Int. Cl.
*H04W 72/04* (2009.01)
*H04L 29/06* (2006.01)
(Continued)

(52) U.S. Cl.
CPC .... *H04W 72/0486* (2013.01); *H04L 29/06176* (2013.01); *H04W 48/02* (2013.01); *H04W 4/005* (2013.01); *H04W 80/04* (2013.01)

(58) Field of Classification Search
CPC .. H04W 72/0486; H04W 48/02; H04W 4/005; H04W 8/04; H04L 29/06176
(Continued)

(56) References Cited

U.S. PATENT DOCUMENTS

| 2011/0199898 | A1* | 8/2011 | Cho | H04W 48/06 370/230 |
| 2012/0281531 | A1* | 11/2012 | Susitaival | H04W 48/06 370/230 |

(Continued)

FOREIGN PATENT DOCUMENTS

| CN | 102404233 A | 12/2011 |
| WO | WO2013025148 A1 | 8/2011 |
| WO | WO2015031202 A1 | 8/2013 |

OTHER PUBLICATIONS

International Search Report and Written Opinion of International Search Authority for PCT/CN2015/073799 dated Jun. 29, 2015 (12 pages).

(Continued)

*Primary Examiner* — Nathan Taylor
(74) *Attorney, Agent, or Firm* — Imperium Patent Works; Zheng Jin

(57) ABSTRACT

A UE establishes an RRC connection with a base station for an application in a mobile communication network. The UE acquires a barring indication that indicates whether scheduling request (SR) barring is applicable for the application. The UE then acquires prioritized barring parameters for SR barring if applicable. The prioritized barring parameters is associated with a priority of the application. Finally, the UE determines whether to send a scheduling request for an arrived packet based on the prioritized barring parameters. In one embodiment, the application is associated with a quality of service (QoS) class indicator (QCI), and the priority of the application is based on the QCI. The prioritized SR barring mechanism based on QCI can be applied for RRC Connected mode with finer granularity.

19 Claims, 8 Drawing Sheets

(51) Int. Cl.
*H04W 48/02* (2009.01)
*H04W 80/04* (2009.01)
*H04W 4/00* (2009.01)

(58) Field of Classification Search
USPC ........................................................ 455/453
See application file for complete search history.

(56) References Cited

U.S. PATENT DOCUMENTS

| | | | | |
|---|---|---|---|---|
| 2013/0035064 A1* | 2/2013 | Balachandran | ....... | H04W 48/02 455/411 |
| 2013/0040597 A1 | 2/2013 | Jang et al. | ................ | 455/404.1 |
| 2013/0040605 A1* | 2/2013 | Zhang | ................... | H04W 48/06 455/411 |
| 2013/0045706 A1* | 2/2013 | Hsu | ...................... | H04W 4/005 455/404.1 |
| 2013/0194998 A1 | 8/2013 | Susitaival et al. | ............ | 370/312 |
| 2013/0294396 A1 | 11/2013 | Iwamura et al. | ............. | 370/329 |
| 2014/0010180 A1* | 1/2014 | Lee | ....................... | H04W 48/02 370/329 |
| 2014/0036685 A1* | 2/2014 | Kim | ....................... | H04W 48/20 370/236 |
| 2015/0111556 A1 | 4/2015 | Hapsari et al. | ............... | 455/418 |
| 2015/0264631 A1* | 9/2015 | Zhang | ................... | H04W 48/08 370/329 |

OTHER PUBLICATIONS

R2-132758 3GPP TSG-RAN2 #83; NTT DOCOMO, Inc.; Requirement and Way forward for SSAC in Connected; Barcelona, Spain dated Aug. 19-23, 2013 (5 pages).

International Search Report and Written Opinion of International Search Authority for PCT/CN2015/073778 dated May 27, 2015 (14 pages).

USPTO, Office Action for related U.S. Appl. No. 14/639,414, dated May 19, 2016 (22 pages).

* cited by examiner

SMART CONGESTION CONTROL FOR RRC CONNECTED MODE IN LTE SYSTEMS

CROSS REFERENCE TO RELATED APPLICATIONS

This application claims priority under 35 U.S.C. §119 from U.S. Provisional Application No. 61/948,814, entitled "The Method of Smart Congestion Controls", filed on Mar. 6, 2014; the subject matter of which is incorporated herein by reference.

TECHNICAL FIELD

The disclosed embodiments relate generally to LTE advanced systems, and, more particularly, to smart congestion control for both RRC Idle and RRC Connected UEs in LTE-Advanced systems.

BACKGROUND

FIG. 1 (Prior Art) illustrates a radio network congestion and a core network congestion use case in an LTE network 100. LTE network 100 comprises an application server 110, a packet data network gateway (PDN GW) 120, a serving GW 130, two base stations eNB141 and eNB142, and a plurality of user equipments (UEs). Radio network congestion occurs when massive concurrent data transmission takes place in the radio access network, as depicted by arrow 151. On the other hand, data congestion may occur in the mobile core network or on the link between the mobile core network and the application server 110 where the data traffic related to the application is aggregated, as depicted by arrow 152.

Modern networks use congestion control and congestion avoidance techniques to try to avoid network congestion. LTE has specified several barring mechanisms for concurrent congestion control. Access Class Barring (ACB) is a mechanism to limit the number of simultaneous access attempts from certain UEs. All UEs are member of one out of ten randomly allocated mobile populations, defined as access class 0 to 9. The population number is stored in UE's SIM/USIM. In addition, the UEs may be members of one or more out of five special categories (e.g., Access Class 11 to 15), also stored in the SIM/USIM. Under the ACB mechanism, the network operator may prevent certain UEs from making access attempts or responding to pages in specific areas of a PLMN based on the corresponding access class. Enhanced access barring (EAB) is an enhanced access barring mechanism to avoid Machine Type Communication (MTC) overload. Service Specific Access Control (SSAC) is used to apply independent access control for telephony services such as IP Multimedia Subsystem multimedia telephony (MMTEL) services.

FIG. 2 (Prior Art) illustrates various barring mechanisms for congestion control in an LTE system 200. LTE specifies several barring mechanisms for concurrent congestion control in different layers. In non-access stratum (NAS) layer, for RRC Idle mode, LTE specifies Service Specific Access Control (SSAC) for MMTEL services and EAB for MTC devices. For RRC Connected mode, SSAC may be applied. In Access stratum (AS) layer, for RRC Idle mode, ACB is in general applicable to all types of services and devices. For RRC Connected mode, random access backoff, RRC reject/release, and scheduling request (SR) masking can be used as well.

Some of the barring mechanisms in LTE, however, have duplicate behavior and therefore may cause quality degradation in some scenarios. For example, double barring of SSAC and ACB for MMTEL service de-prioritizes MMTEL service and LTE fails to prioritize MMTEL service over other services. Furthermore, congestion control for RRC Connected UEs becomes more important as the trend is to keep UE in RRC Connected for data applications. However, LTE lacks congestion control mechanism for RRC Connected mode. Therefore, it is desirable to provide a feasible congestion control mechanism with a fine granularity that can prioritize or deprioritize services based on operator's requirement. In addition, the congestion control mechanism can be applied for RRC Connected mode as well with proper granularity.

SUMMARY

A smart congestion control method is proposed for UEs in RRC Idle mode and in RRC Connected mode in a 3GPP LTE-Advanced network.

In one novel aspect, a UE initiates an MMTEL service in RRC Idle mode in a mobile communication network. The UE acquires access control information from a base station. The access control information indicates whether ACB is applicable to MMTEL service type. The UE then performs SSAC check for the MMTEL service based on the access control information. The UE also performs ACB check for the MMTEL service if ACB is applicable to the MMTEL service. Otherwise, the UE bypasses the ACB check for the MMTEL service. The access control information comprises SSAC configuration information, ACB parameters information, and ACB bypass information. In one embodiment, the MMTEL service type has multiple subtypes including voice, video, and text, and the ACB bypass information contains one or more indications, each indication indicates whether ACB is applicable to an MMTEL service subtype. In another embodiment, the UE comprises a NAS layer and an AS layer, and the NAS layer forwards MMTEL service type indication to the AS layer for determining whether to bypass ACB. In yet another embodiment, after SSAC/ACB check, the UE performs random access with prioritized RA backoff. The RA backoff value is different for different service types, and the RA backoff value is contained in a new control element (CE) in a random access response (RAR).

In another novel aspect, a UE establishes an RRC connection with a base station for an application in a mobile communication network. The UE acquires a barring indication that indicates whether scheduling request (SR) barring is applicable for respective applications. The UE then acquires prioritized barring parameters for SR barring if applicable. The prioritized barring parameters is associated with a priority of the application. Finally, the UE determines whether to send a scheduling request for an arrived packet based on the prioritized barring parameters. In one embodiment, the application is associated with a quality class indicator (QCI), and the priority of the application is based on the QCI. In another embodiment, the UE comprises a NAS layer and an RRC layer, where the RRC layer forwards the barring indication and the prioritized barring parameters to the NAS layer for determining SR barring. In yet another embodiment, the prioritized barring parameters can be the same as or separate from the ACB barring parameters applied for RRC Idle mode, and the eNB signals a bitmap for indicating which prioritization should apply.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
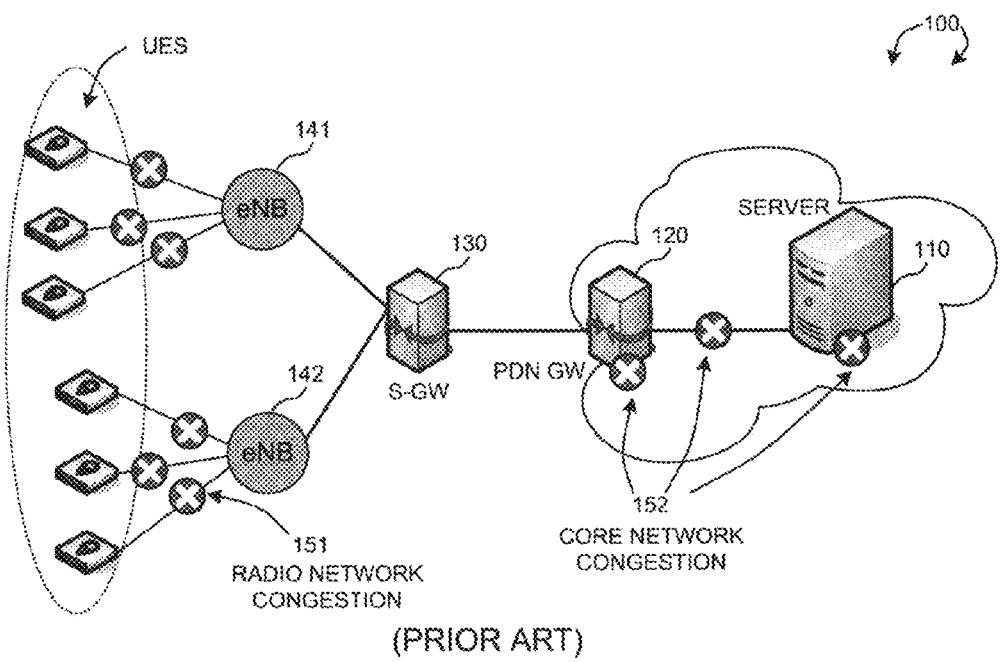
FIG. 1 (Prior Art) illustrates a radio network congestion use case and a core network congestion use case in an LTE network.
Figure 2:
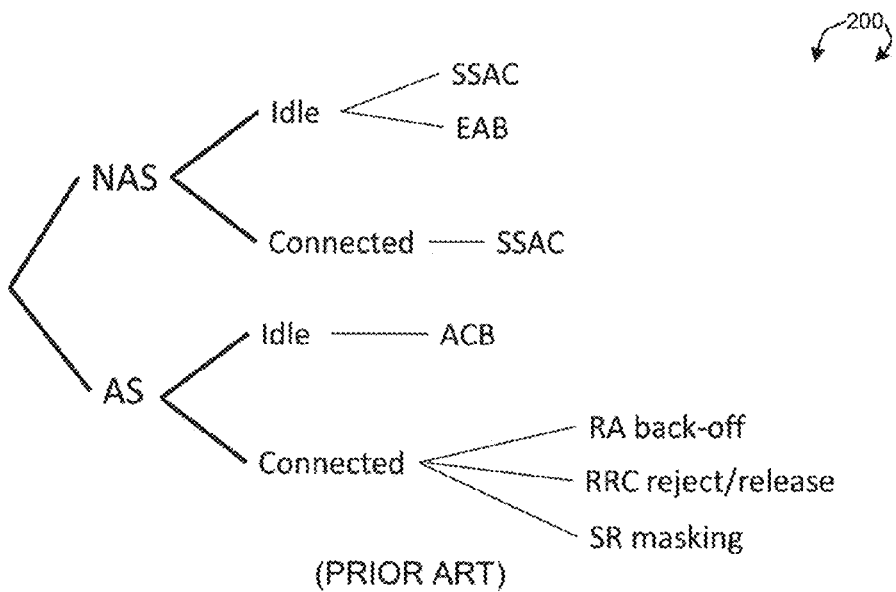
FIG. 2 (Prior Art) illustrates various barring mechanisms for congestion control in an LTE system.
Figure 3:
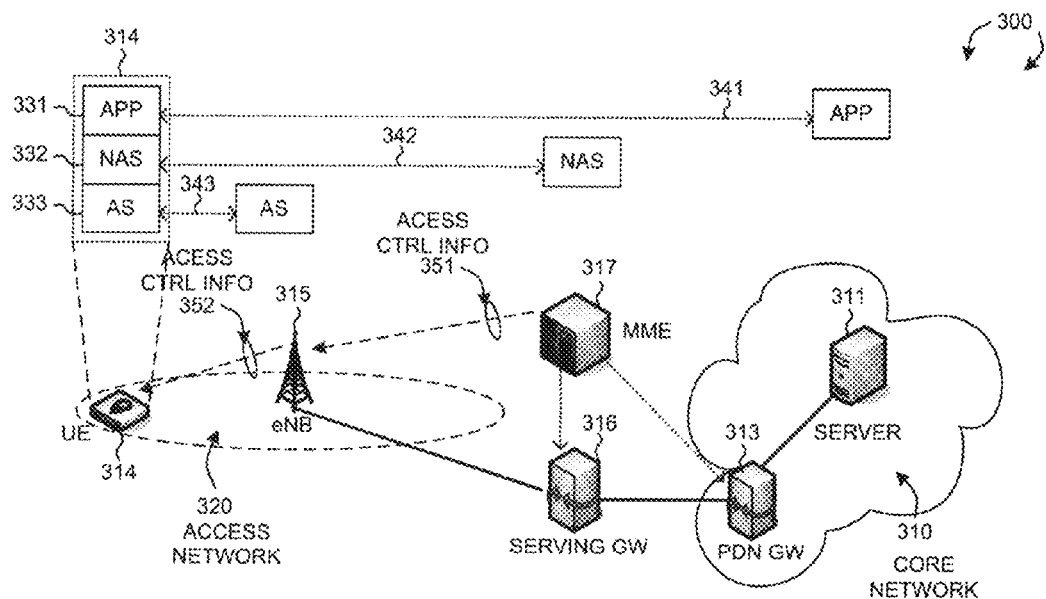
FIG. 3 illustrates a 3GPP LTE network that supports smart congestion control mechanism in accordance with one novel aspect.

FIG. 3 illustrates a 3GPP LTE network 300 that supports smart congestion control mechanism in accordance with one novel aspect. 3GPP LTE network 300 comprises an application server 311 that provides various services by communicating with a plurality of user equipments (e.g., UE 314 as illustrated in FIG. 3). In FIG. 3, server 311 and a packet data network gateway (PDN GW) 313 belong to part of a core network 310. UE 314 and its serving base station (eNB) 315 belong to part of a radio access network (RAN) 320. Server 311 communicates with UE 314 through PDN GW 313, serving GW 316, and eNB 315. A mobility management entity (MME) 317 communicates with eNB 315, serving GW 316 and PDN GW 313 for mobility management of wireless access devices in 3GPP network 300.

In the example of FIG. 3, server 311 provides various services/applications in application (APP) protocol layer. To provide the end-to-end services, server 311 communicates with the plurality of UEs in the 3GPP network. Each UE (e.g. UE 314) comprises various protocol layer modules to support the end-to-end applications and data connections. In the application level, APP module 331 communicates with server 311 in APP protocol layer (e.g., depicted by dashed line 341), which provides the end-to-end control/data. In the network or NAS level, NAS module 332 communicates with MME 317 in non-access stratum protocol layer (e.g., depicted by dashed line 342), which supports mobility management and other signaling functionality. In the radio network access (RAN) or AS level, RRC module 333 communicates with eNB 315 in radio resource control (RRC) protocol layer (e.g., depicted by dashed line 343), which takes care of broadcast of system information, RRC connection control, paging, radio configuration control, QoS control, etc.

LTE specifies several barring mechanisms for concurrent congestion control in different layers. In AS layer, Access Class Barring (ACB) is a mechanism to limit the number of simultaneous access attempts from certain UEs. Under the ACB mechanism, the network operator may prevent certain UEs from making access attempts or responding to pages in specific areas of a PLMN based on the corresponding access class. There are different ways to implementing access barring. For example, access barring is achieved via barring parameters including access probability (e.g., barring factor) and retry timer (e.g., barring time) performed at the UE side. In NAS layer, Service Specific Access Control (SSAC) is used to apply independent access control for telephony services such as IP Multimedia Subsystem multimedia telephony (MMTEL) services. The SSAC mechanism is similar to ACB, and access barring can be achieved via barring parameters including access probability (e.g., barring factor) and retry timer (e.g., barring time) performed at the UE side. The double barring of SSAC and ACB for MMTEL service de-prioritizes MMTEL service and LTE fails to prioritize MMTEL service over other services.

In one novel aspect, a smart congestion control mechanism is provided for the network operator to control access attempts from UEs to prevent overload of the access network and/or the core network. In congestion situations, the network operator can prioritize or de-prioritize certain service types. For example, the network operator can de-prioritize MMTEL service during normal situation by applying double barring of SSAC/ACB. During special occasions when MMTEL service is expected to be more popular, the network operator can prioritize MMTEL service by applying ACB bypassing. For example, in AS layer, eNB 315 determines SSAC information, ACB information, and ACB bypass information based on access control configuration transmitted from MME 317 as depicted by line 351. The access control information is then broadcasted from eNB 315 to UE 314 via system information block as depicted by line 352. Upon acquiring the access control information, UE 314 attempts RRC access subject to SSAC/ACB control. If UE 314 gains RRC access, then UE 314 further attempts random access with backoff prioritization. Finally, after UE 314 establishes RRC connection, eNB 315 determines whether to apply additional barring control including SR masking in RRC Connected mode.

Figure 4:
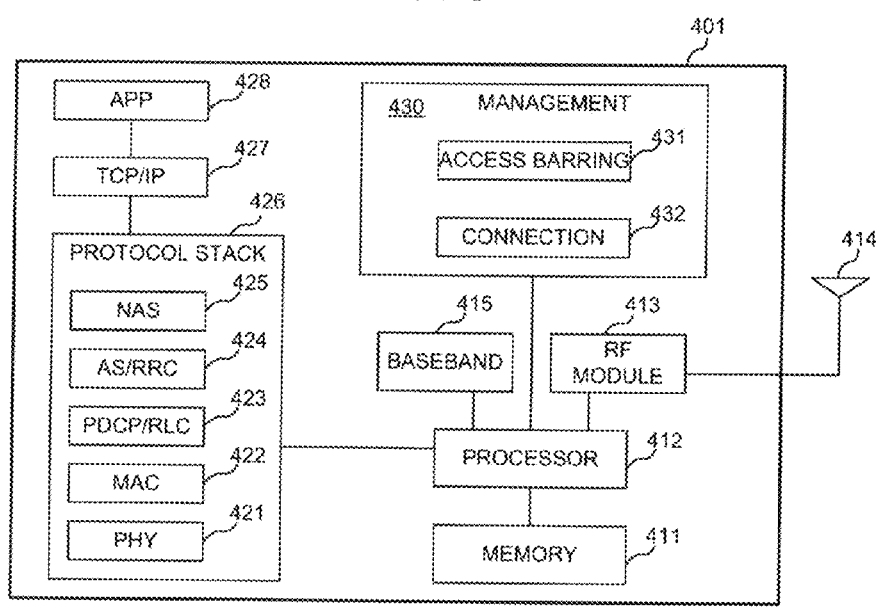
FIG. 4 is a simplified block diagram of a user equipment (UE) that supports certain embodiments of the present invention.

FIG. 4 is a simplified block diagram of a user equipment (UE) 401 that supports certain embodiments of the present invention. UE 401 comprises memory 411, a processor 412, a radio frequency (RF) module 413 coupled to antenna 414, a baseband module 415, a 3GPP protocol stack module 426 supporting various protocol layers including NAS 425, AS/RRC 424, PDCP/RLC 423, MAC 422 and PHY 421, a TCP/IP protocol stack module 427, an application module APP 428, and a management module 430 including an access barring module 431, and an RRC connection management module 432. The access barring module may further comprise an SSAC module for NAS layer access control and an ACB module for AS layer access control. The various function modules may be implemented and configured by software, firmware, hardware, and any combination thereof. The function modules, when executed by processor 412 (via program instructions contained in memory 411), interwork with each other to allow UE 401 to perform certain embodiments of the present invention accordingly.

Figure 5:
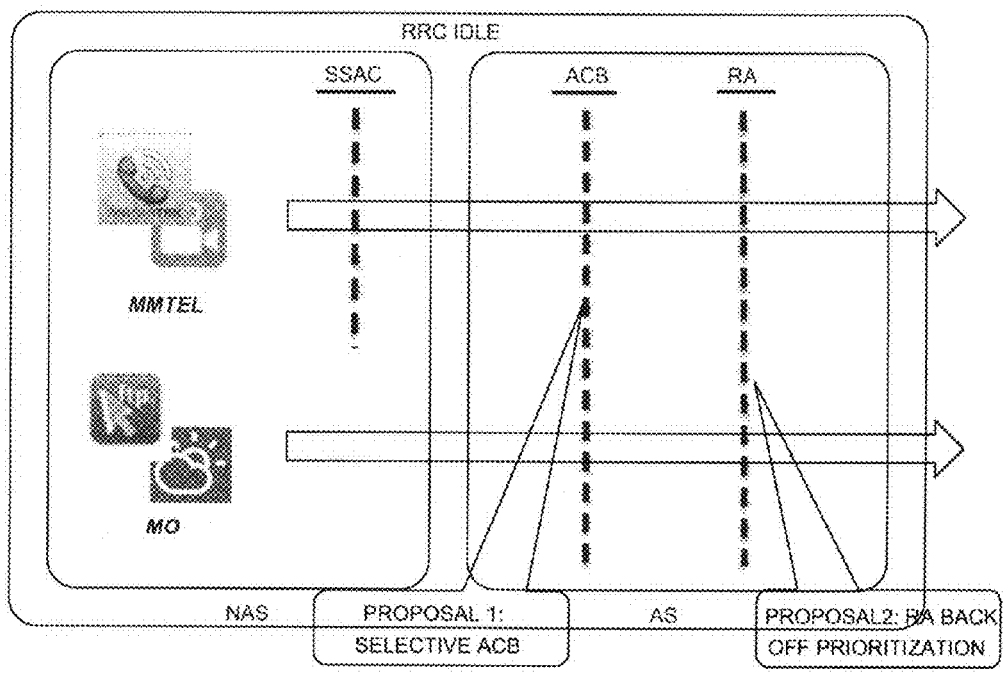
FIG. 5 illustrates a method of smart congestion control in RRC Idle mode.

FIG. 5 illustrates a method of smart congestion control for a UE in RRC Idle mode. The UE comprises a NAS layer and an AS layer. When MMTEL service arrives from the NAS layer, the NAS layer performs SSAC check to verify if the UE is barred from NAS layer access. After satisfying the SSAC check, NAS layer notifies AS layer that a service is arrived and an RRC connection is required. Afterwards, the AS layer further performs ACB check to verify if the UE is barred from AS layer access. On the other hand, for other mobile originated (MO) data service such as FTP, there is no NAS layer access control, and NAS layer could directly notify AS layer that service request and only AS layer ACB check is performed for MO data service. Therefore, the traditional double barring for MMTEL service de-prioritizes MMTEL service. In accordance with one novel aspect, the AS layer performs selective ACB. With selective ACB, the ACB check may be bypassed for MMTEL service if configured by the network. This way, MMTEL service is not always de-prioritized. Instead, MMTEL service can be prioritized through bypassing ACB check in AS layer. After the UE passes the AS layer access control, the UE starts a contention-based random access (RA) procedure with a backoff window to gain access to the radio network. In accordance with another novel aspect, the RA backoff value is prioritized based on traffic type. Different backoff values are used for different traffic types. After completing the RA procedure, the UE establishes an RRC connection with the network and enters RRC Connected mode.

Figure 6:
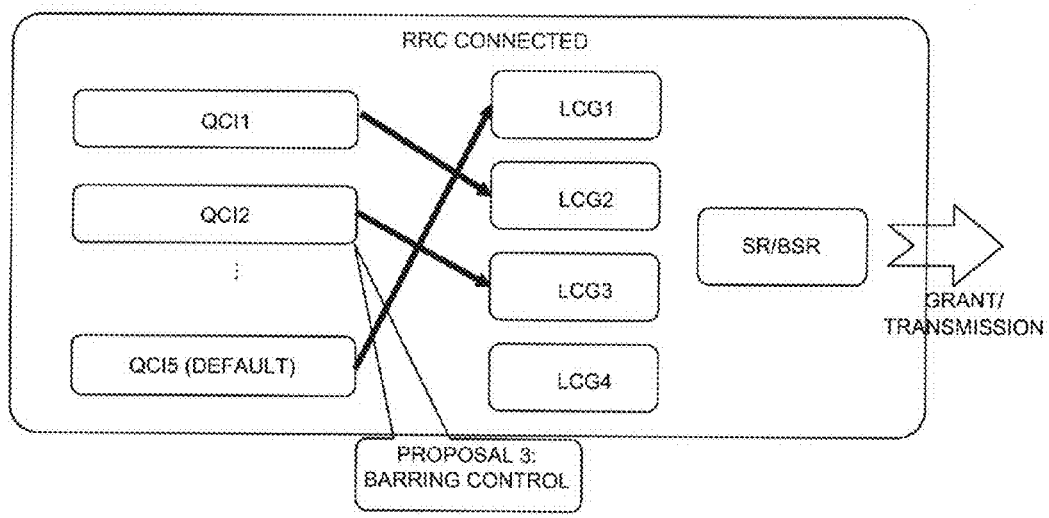
FIG. 6 illustrates a method of smart congestion control in RRC Connected mode.

FIG. 6 illustrates a method of smart congestion control in RRC Connected mode. After the UE establishes an RRC connection for the application, the specific application is associated with a certain QoS class indicator (QCI) respectively. For example, there are total nine (9) QCIs, and each QCI is then mapped to a corresponding logical channel group (LCG). The MMTEL service may be associated with QCI1, while the MO data service may be associated with QCI5 (the default QCI). In accordance with one novel aspect, additional barring control may be applied for the subscribed applications, which have different prioritizations (e.g., based on QCI). Different prioritization have different barring parameters for the UE to decide whether scheduling request (SR) and buffer status report (BSR) can be sent. The network will grant transmission to the UE only if the UE is not barred from sending SR/BSR.

For a UE to perform selective ACB, the network (eNB) needs to indicate the bypass of ACB to the UE. In a first embodiment, the eNB uses a new information bit in SIB. The new information bit indicates whether ACB bypass should be applied for MMTEL service. In a second embodiment, the eNB changes the existing SSAC parameter, e.g., adding one bit to indicate whether ACB bypass should be applied for MMTEL service. In a third embodiment, a predefined ACB barring value is used to implicitly indicate whether ACB bypass should be applied for MMTEL service. In a fourth embodiment, separate new information bits in SIB are used for individual MMTEL service subtypes including voice, video, and text. For example, three new information bits are defined in SIB, and each bit indicates whether ACB bypass should be applied for MMTEL voice, video, and text service respectively.

Figure 7:
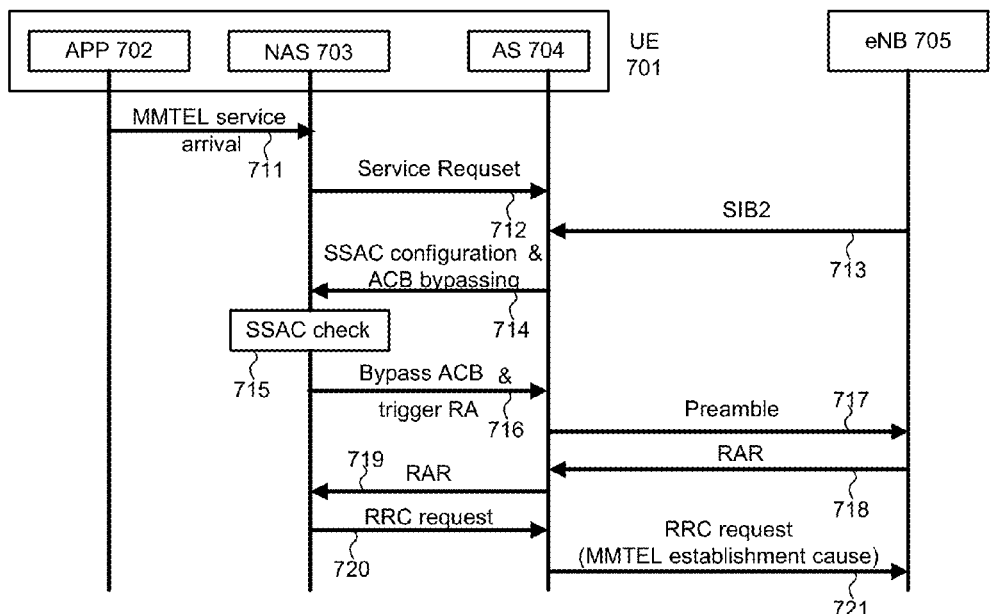
FIG. 7 illustrates one embodiment of selective access control barring (ACB).

FIG. 7 illustrates one embodiment of selective access control barring (ACB) from UE perspective. In the example of FIG. 7, UE 701 comprises an application layer APP 702, a NAS layer NAS 703, and an AS layer AS 704. In step 711, APP 702 forwards an arrived MMTEL service to NAS 703. In step 712, NAS 703 forwards the service request to AS 704. In step 713, AS 704 receives SIB2 broadcasted from eNB 705. SIB2 comprises various access control information including SSAC configuration, ACB parameters, and ACB bypass information. In step 714, AS 704 forwards the received SSAC configuration and ACB bypass information to NAS 703. In step 715, NAS 703 performs SSAC check for the MMTEL service. If the UE passes the SSAC check, and if the ACB bypass information indicates to bypass ACB check for the corresponding MMTEL service type or subtype(s), then in step 716, NAS 703 request AS 704 to trigger the subsequent random access (RA) procedure without ACB. In step 717, AS 704 sends a random access preamble to eNB 705. In step 718, eNB 705 sends a random access response (RAR) back to UE 701. In step 719, AS 704 forwards the RAR to NAS 703, which sends out an RRC request to AS 704 in step 720. Finally, in step 721, AS 704 sends the RRC request with establishment cause to eNB 705 for establishing an RRC connection.

Figure 8:
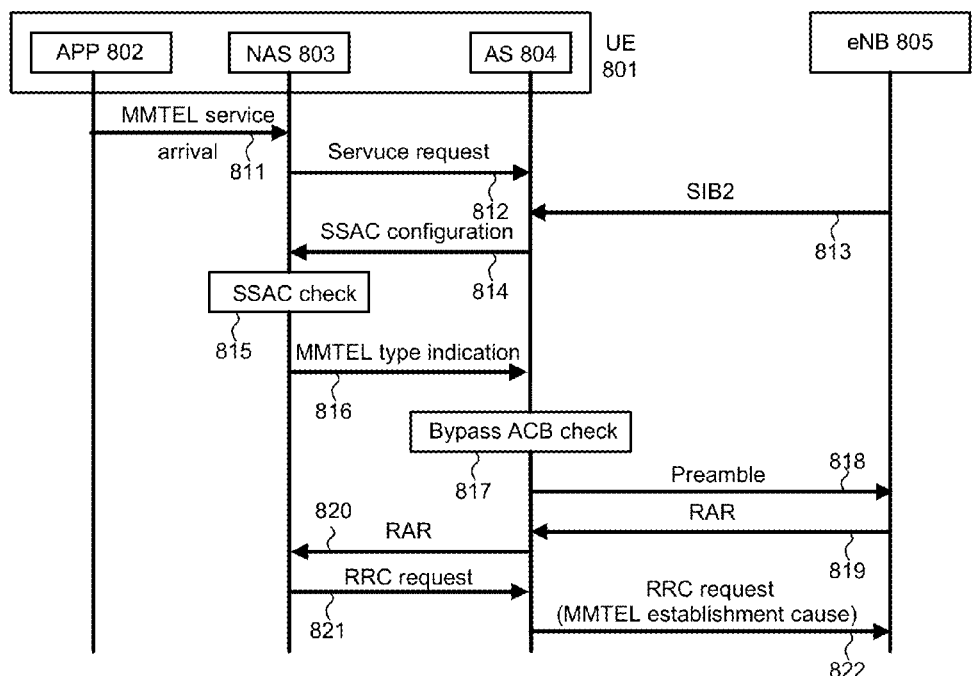
FIG. 8 illustrates another embodiment of selective access control barring (ACB).

FIG. 8 illustrates another embodiment of selective access control barring (ACB) from UE perspective. In the example of FIG. 8, UE 801 comprises an application layer APP 802, a NAS layer NAS 803, and an AS layer AS 804. In step 811, APP 802 forwards an arrived MMTEL service to NAS 803. In step 812, NAS 803 forwards the service request to AS 804. In step 813, AS 804 receives SIB2 broadcasted from eNB 805. SIB2 comprises various access control information including SSAC configuration, ACB parameters, and ACB bypass information. In step 814, AS 804 forwards the received SSAC configuration to NAS 803. In step 815, NAS 803 performs SSAC check for the MMTEL service. If the UE passes the SSAC check, then in step 816, NAS 803 forwards the MMTEL service type and/or subtype(s) to AS 804. In step 817, AS 804 either performs ACB check or bypasses ACB check based on the indicated subtype(s), received ACB parameters and the ACB bypass information. In this embodiment, NAS 803 informs AS 804 the arrived traffic type of MMTEL and/or the subtypes. As a result, AS 804 triggers the subsequence random access (RA) procedure without ACB if the traffic type satisfies the ACB bypass configuration. In step 818, AS 804 sends a random access preamble to eNB 805. In step 819, eNB 705 sends a random access response (RAR) back to UE 801. In step 820, AS 804 forwards the RAR to NAS 803, which sends out an RRC request to AS 804 in step 821. Finally, in step 822, AS 804 sends the RRC request with establishment cause to eNB 805 for establishing an RRC connection.

Figure 9:
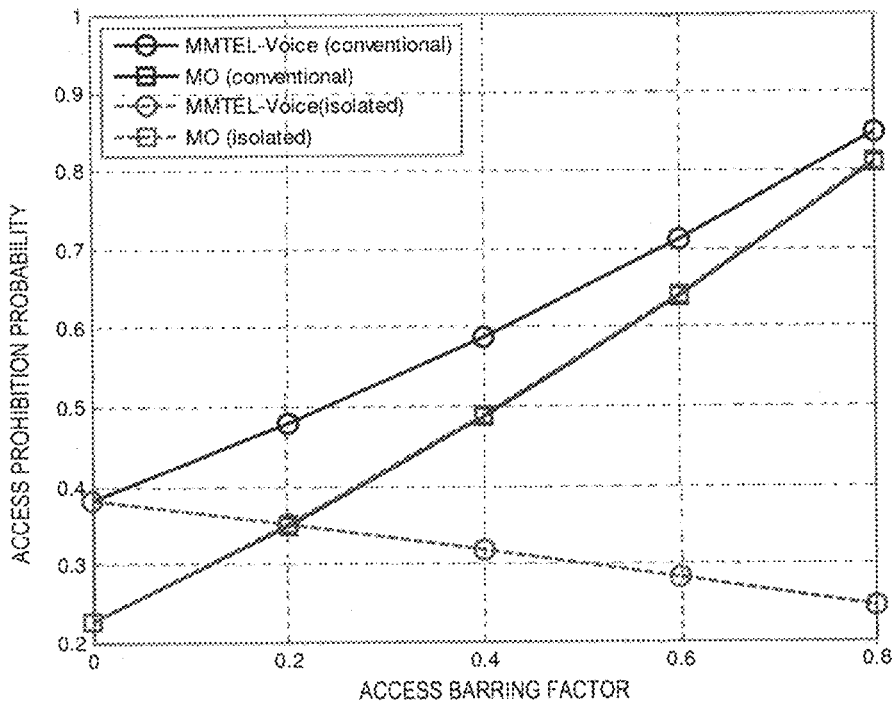
FIG. 9 illustrates the barring rate performance of selective ACB.

FIG. 9 illustrates the barring rate performance of selective ACB. As illustrated in FIG. 9, for conventional MMTEL-voice service and MO service, the barring rate (access prohibition probability) increases as the ACB barring factor increases. However, for isolated MMTEL-voice service, if ACB bypass is applied, the barring rate decreases while the ACB barring factor increases (assuming that the SSAC barring factor is fixed to 0.2). Therefore, it shows that under selective ACB, the MMTEL-voice service is prioritized over MO service by increasing the ACB barring factor.

Figure 10:
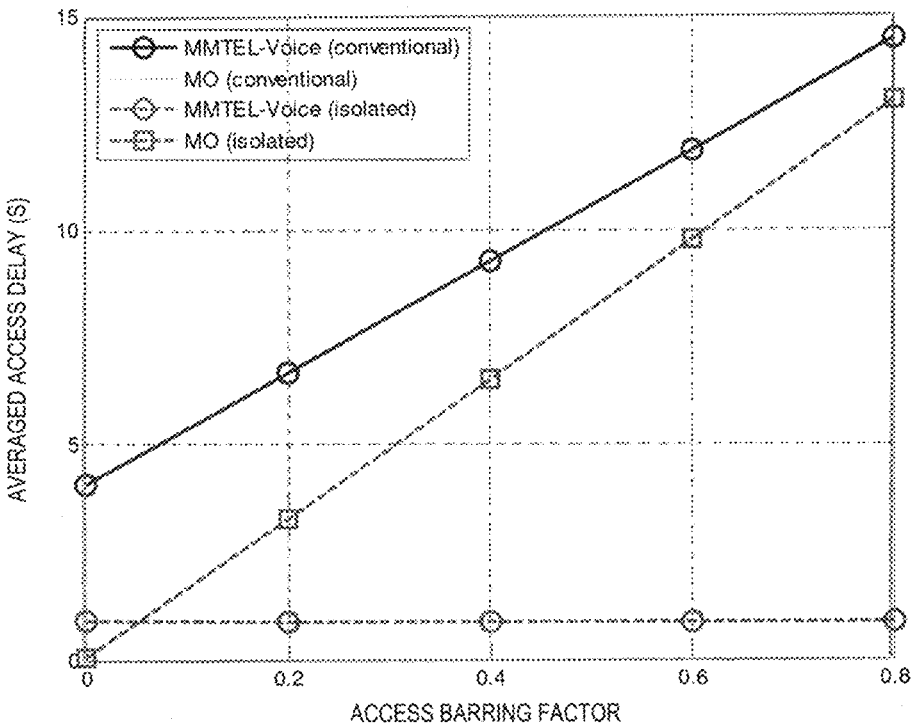
FIG. 10 illustrates the delay performance of selective ACB.

FIG. 10 illustrates the delay performance of selective ACB. As illustrated in FIG. 10, for conventional MMTEL-voice service and MO service, the delay performance (averaged access delay) increases as the ACB barring factor increases. However, for isolated MMTEL-voice service, if ACB bypass is applied, the average access delay remains the same while the ACB barring factor increases (assuming that the SSAC barring factor is fixed to 0.2). Therefore, it shows that under selective ACB, the MMTEL-voice service is prioritized over MO service by increasing the ACB barring factor.

If access is not barred by the NAS/AS layer, then the UE starts a contention-based random access (RA) procedure with the network. Traditionally, MAC header will specify a backoff interval (BI) value for contention resolution. A dedicated mapping table for BI value with respect to backoff window size is applied for all traffic type. In accordance with another novel aspect, the RA backoff is prioritized based on traffic type. Different backoff values are applied for different service or application type in order to provide more congestion control granularity. In a first embodiment, different mapping tables are used for different traffic types. In a second embodiment, RA backoff bypass is applied for certain traffic type. In a third embodiment, a new control element (CE) is used for carrying specific backoff value in RAR. In a fourth embodiment, default backoff values are used for particular services. In one example, NAS layer notifies the traffic type to AS layer for using corresponding backoff value. In another example, AS layer forward backoff parameters to NAS layer for selecting corresponding backoff value based on the traffic type.

Figure 11:
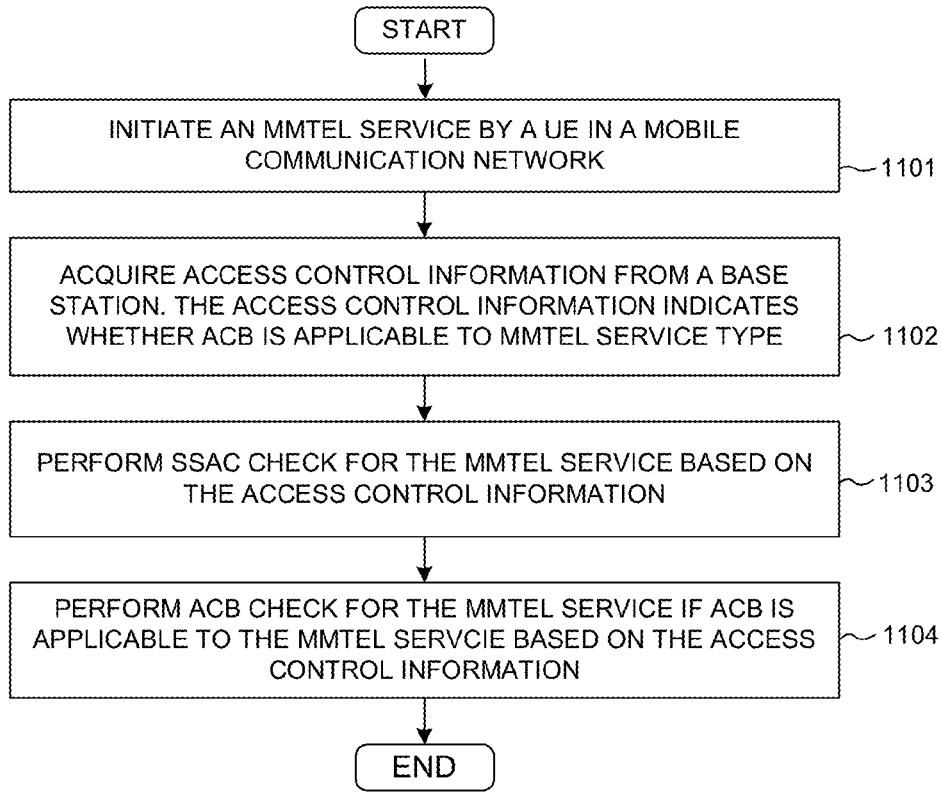
FIG. 11 is a flow chart of a method of selective ACB for MMTEL service from UE perspective in accordance with one novel aspect.

FIG. 11 is a flow chart of a method of selective ACB for MMTEL service from UE perspective in accordance with one novel aspect. In step 1101, a UE initiates an MMTEL service in a mobile communication network. In step 1102, the UE acquires access control information from a base station. The access control information indicates whether ACB is applicable to MMTEL service type. In step 1103, the UE performs SSAC check for the MMTEL service based on the access control information. In step 1104, the UE performs ACB check for the MMTEL service if ACB is applicable to the MMTEL service. Otherwise, the UE bypasses the ACB check for the MMTEL service. The access control information comprises SSAC configuration information, ACB parameters information, and ACB bypass information. In one embodiment, the MMTEL service type has multiple subtypes including voice, video, and text, and the ACB bypass information contains one or more indications, each indication indicates whether ACB is applicable to an MMTEL service subtype. In another embodiment, the UE comprises a NAS layer and an AS layer, and the NAS layer forwards MMTEL service type indication to the AS layer for determining whether to bypass ACB.

Figure 12:
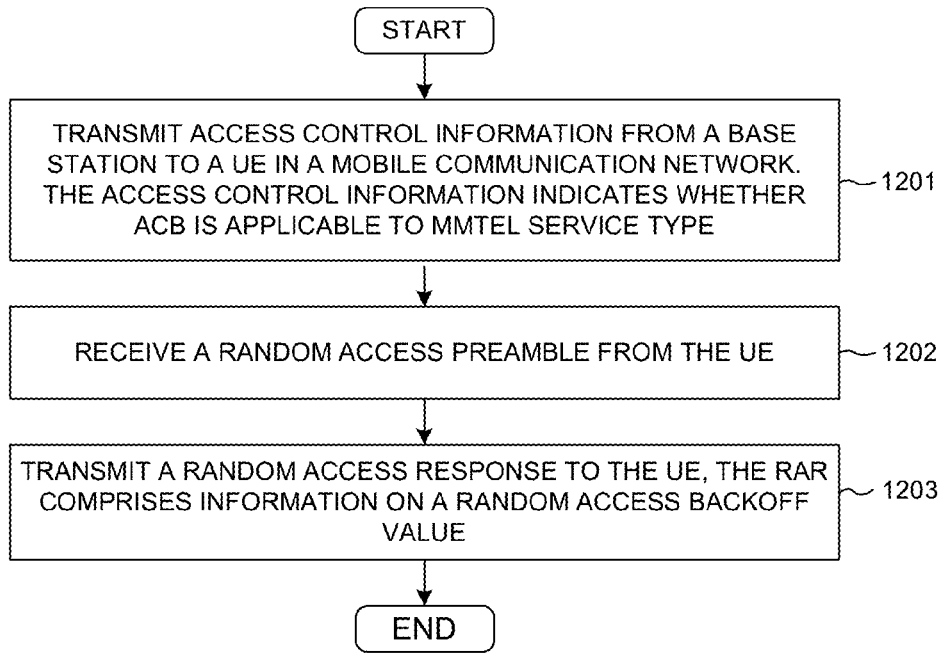
FIG. 12 is a flow chart of a method of selective ACB for MMTEL service from eNB perspective in accordance with one novel aspect.

FIG. 12 is a flow chart of a method of selective ACB for MMTEL service from eNB perspective in accordance with one novel aspect. In step 1201, a base station transmits access control information to a UE in a mobile communication network. The access control information indicates whether ACB is applicable to MMTEL service type. In step 1202, the base station receives a random access preamble from the UE. In step 1203, the base station transmits a random access response (RAR) to the UE. The RAR comprises information on a random access (RA) backoff value. The access control information comprises SSAC configuration information, ACB parameters information, and ACB bypass information. In one embodiment, the MMTEL service type has multiple subtypes including voice, video, and text, and the ACB bypass information contains one or more indications, each indication indicates whether ACB is applicable to an MMTEL service subtype. In another embodiment, the RA backoff value is different for different service types, and the RA backoff value is contained in a new control element (CE) in the RAR.

Figure 13:
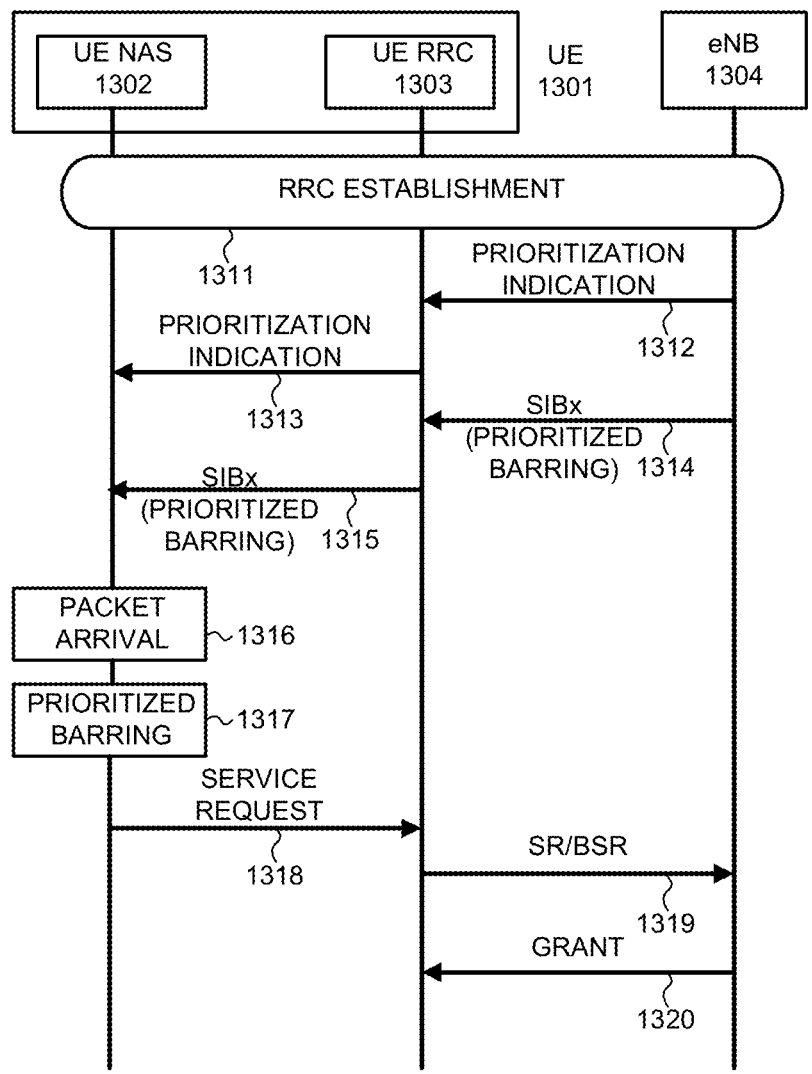
FIG. 13 illustrates one embodiment of smart congestion control in RRC Connected mode.

FIG. 13 illustrates one embodiment of smart congestion control in RRC Connected mode. In the example of FIG. 13, UE 1301 comprises a NAS layer 1302 and an AS/RRC layer 1303. In step 1311, UE 1301 establishes an RRC connection and radio bearer with its serving bases station eNB 1304 for an application. The application (and the radio bearer) is associated with a quality of service (QoS) class indicator (QCI) respectively, or is associated with an allocation and retention priority (ARP). In step 1312, eNB 1304 transmits a prioritization indication to UE RRC 1303, which forwards the indication to UE NAS 1302 in step 1313. The prioritization indication indicates whether barring control in RRC Connected mode should be applied or not. If no barring control in RRC Connected mode, then the base station will not transmit any barring control parameters, and the UE is allowed to send scheduling request whenever needed. On the other hand, if barring control should be applied in RRC Connected mode, then in step 1314, eNB 1304 broadcasts prioritized barring parameters to UE RRC 1303 via SIBx. UE RRC 1303 then forwards the prioritized barring parameters to UE NAS 1302 in step 1315.

Different barring parameters are assigned to different prioritization based on the QCI/ARP of each application. For example, an application with higher QCI is assigned to have lower barring factor and shorter barring time, while an application with lower QCI is assigned to have higher barring factor and longer barring time. Those barring parameters can be separate and independent from the barring parameters of ACB in RRC Idle mode. Alternatively, the same barring parameters of ACB in RRC Idle mode can be used in RRC Connected mode, and the base station only needs to signal the UE a bitmap indicating which prioritization shall apply. As mentioned earlier, there may have total 9 QCIs and different applications are associated with different QCIs. The bitmap would be a 9-bit bitmap that each bit stands for a specific QCI. If the bit is "1", it means the application associating with the corresponding QCI shall perform prioritized barring (using the same ACB parameter as in RRC Idle mode), otherwise, the application can initiate scheduling request without prioritized barring. In addition, eNB 1304 can change the barring parameters when modification period is coming. Such prioritization barring based on QCI/ARP has finer granularity congestion control for RRC Connected mode. Later on, in step 1316, a packet arrives at UE NAS 1302. In step 1317, UE NAS 1302 applies prioritized barring for the arrived packet. If the UE is not barred, then in step 1318, UE NAS 1302 forwards a service request to UE RRC 1303. In step 1319, UE RRC 1303 sends SR/BSR to eNB 1304. Finally, in step 1320, eNB 1304 sends an uplink grant to UE RRC 1303 for data transmission in response to the SR/BSR.

Figure 14:
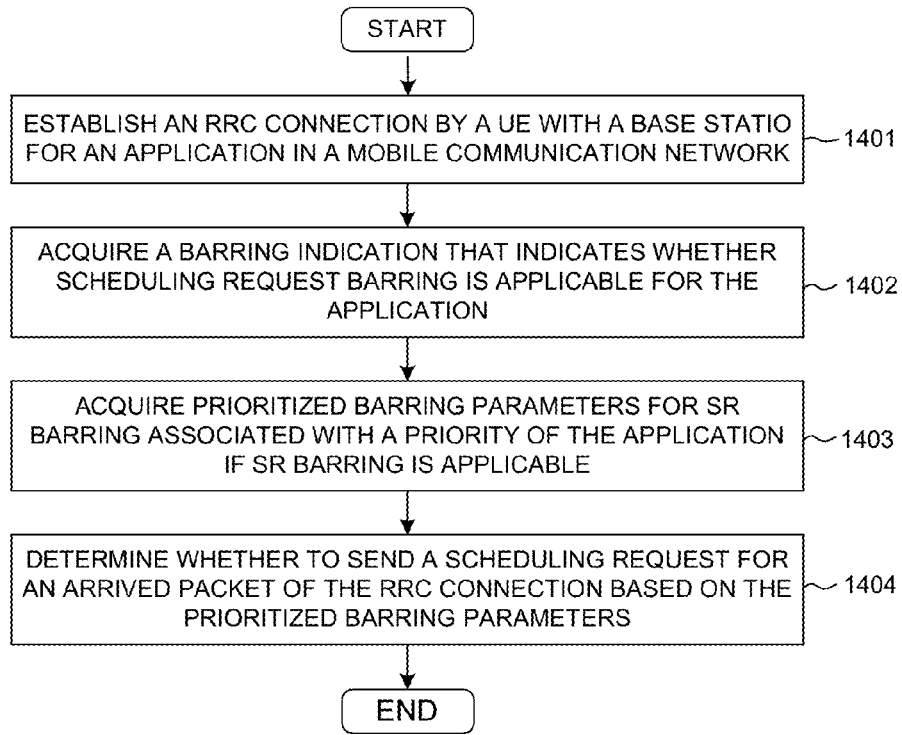
FIG. 14 is a flow chart of a method of smart congestion control in RRC Connected mode from UE perspective in accordance with one novel aspect.

FIG. 14 is a flow chart of a method of smart congestion control in RRC Connected mode from UE perspective in accordance with one novel aspect. In step 1401, a UE establishes an RRC connection with a base station for an application in a mobile communication network. In step 1402, the UE acquires a barring indication that indicates whether scheduling request (SR) barring is applicable for the application. In step 1403, the UE acquires prioritized barring parameters for SR barring if applicable. The prioritized barring parameters is associated with a priority of the application. In step 1404, the UE determines whether to send a scheduling request for an arrived packet based on the prioritized barring parameters. In one embodiment, the application is associated with a quality class indicator (QCI), and the priority of the application is based on the QCI. In another embodiment, the UE comprises a NAS layer and an AS/RRC layer, where the AS/RRC layer forwards the barring indication and the prioritized barring parameters to the NAS layer for determining SR barring.

Figure 15:
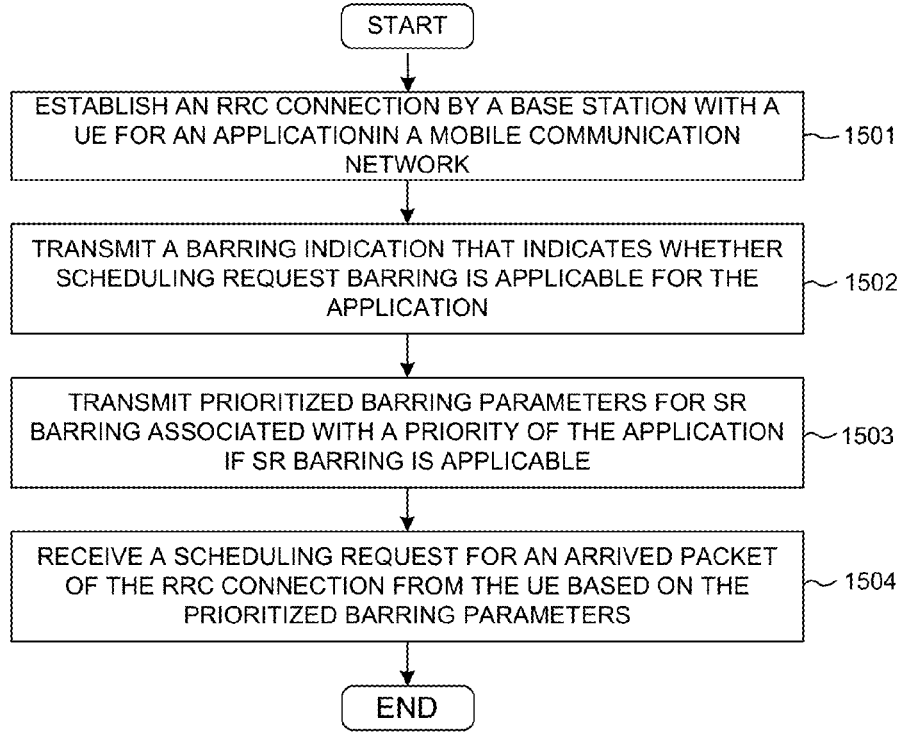
FIG. 15 is a flow chart of a method of smart congestion control in RRC Connected mode from base station perspective in accordance with one novel aspect.

FIG. 15 is a flow chart of a method of smart congestion control in RRC Connected mode from base station perspective in accordance with one novel aspect. In step 1501, a base station establishes an RRC connection with a UE for an application in a mobile communication network. In step 1502, the base station transmits a barring indication that indicates whether scheduling request (SR) barring is applicable for the application. In step 1503, the base station transmits prioritized barring parameters for SR barring if applicable. The prioritized barring parameters is associated with a priority of the application. In step 1504, the base station receives a scheduling request for an arrived packet of the RRC connection from the UE based on the prioritized parameters. In one embodiment, the application is associated with a quality class indicator (QCI), and the priority of the application is based on the QCI. In another embodiment, the prioritized barring parameters can be separate from the ACB barring parameters for RRC Idle mode. In yet another embodiment, the prioritized barring parameters are the same as the ACB parameters applied for RRC Idle mode, and the eNB signals a bitmap for indicating which prioritization should apply for SR barring.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    establishing a radio resource control (RRC) connection by a user equipment (UE) with a base station for an application in a mobile communication network;
    acquiring a barring indication that indicates whether scheduling request (SR) barring of the established RRC connection is applicable for the application in RRC connected mode;
    acquiring prioritized barring parameters for SR barring associated with a priority of the application if SR barring is applicable, wherein the application is associated with an allocation and retention priority (ARP), and wherein the priority of the application is based on the ARP; and
    determining whether to send a scheduling request for an arrived packet of the established RRC connection in RRC Connected mode based on the prioritized barring parameters.

2. The method of claim 1, wherein the application is associated with a quality class indicator (QCI), and wherein the priority of the application is based on the QCI.

3. The method of claim 1, wherein the prioritized barring parameters comprises a prioritized barring factor and a prioritized barring time.

4. The method of claim 1, wherein different applications with different priorities have different barring factors and barring times.

5. The method of claim 1, wherein the UE comprises a NAS layer and an RRC layer, wherein the RRC layer forwards the barring indication and the prioritized barring parameters to the NAS layer for determining SR barring.

6. The method of claim 1, wherein the UE also determines whether to send buffer status report (BSR) for the RRC connection based on the prioritized barring parameters.

7. A user equipment (UE), comprising:
    a radio resource control (RRC) connection module that establishes an RRC connection with a base station for an application in a mobile communication network;
    a receiver that receives a barring indication that indicates whether scheduling request (SR) barring of the established RRC connection is applicable for the application in RRC connected mode, wherein the receiver also receives prioritized barring parameters for SR barring associated with a priority of the application if SR barring is applicable, wherein the application is associated with an allocation and retention priority (ARP), and wherein the priority of the application is based on the ARP; and
    a prioritized access barring module that determines whether to send a scheduling request for an arrived packet of the established RRC connection in RRC Connected mode based on the prioritized barring parameters.

8. The UE of claim 7, wherein the application is associated with a quality class indicator (QCI), and wherein priority of the application is based on the QCI.

9. The UE of claim 7, wherein the prioritized barring parameters comprises a prioritized barring factor and a prioritized barring time.

10. The UE of claim 7, wherein different applications with different priorities have different barring factors and barring times.

11. The UE of claim 7, wherein the UE comprises a NAS layer and an RRC layer, wherein the RRC layer forwards the barring indication and the prioritized barring parameters to the NAS layer for determining SR barring.

12. The UE of claim 7, wherein the UE also determines whether to send buffer status report (BSR) for the RRC connection based on the prioritized barring parameters.

13. A method comprising:
    establishing a radio resource control (RRC) connection by a base station with a user equipment (UE) for an application in a mobile communication network;
    transmitting a barring indication that indicates whether scheduling request (SR) barring of the established RRC connection is applicable for the application;
    transmitting prioritized barring parameters for SR barring associated with a priority of the application if SR barring is applicable, wherein the application is associated with an allocation and retention priority (ARP), and wherein the priority of the application is based on the ARP; and
    receiving a scheduling request for an arrived packet of the established RRC connection from the UE in RRC connected mode based on the prioritized barring parameters.

14. The method of claim 13, wherein the application is associated with a quality class indicator (QCI), and wherein the priority of the application is based on the QCI.

15. The method of claim 13, wherein the prioritized barring parameters comprises a prioritized barring factor and a prioritized barring time.

16. The method of claim 15, wherein different applications with different priorities have different barring factors and barring times.

17. The method of claim 13, wherein the base station broadcasts the prioritized barring parameters via system information block (SIB).

18. The method of claim 13, wherein the barring parameters are independent from access control barring (ACB) parameters applied for RRC Idle mode.

19. The method of claim 13, wherein the barring parameters are the same as access control barring (ACB) parameters applied for RRC Idle mode.

* * * * *